Nov. 19, 1968 B. SUCHOWSKI 3,411,790

TOY PHONOGRAPH FOR USE WITH CHANGEABLE RECORDS

Filed July 21, 1965 3 Sheets-Sheet 1

INVENTOR.
BERNARD SUCHOWSKI

BY James and Franklin

ATTORNEYS

Nov. 19, 1968 B. SUCHOWSKI 3,411,790

TOY PHONOGRAPH FOR USE WITH CHANGEABLE RECORDS

Filed July 21, 1965 3 Sheets-Sheet 2

INVENTOR.
BERNARD SUCHOWSKI

BY James and Franklin

ATTORNEYS

INVENTOR.
BERNARD SUCHOWSKI
BY
James and Franklin
ATTORNEYS

United States Patent Office 3,411,790

Patented Nov. 19, 1968

3,411,790
TOY PHONOGRAPH FOR USE WITH CHANGEABLE RECORDS

Bernard Suchowski, Howard Beach, N.Y., assignor, by mesne assignments, to Ideal Toy Corporation, Hollis, N.Y., a corporation of New York Filed July 21, 1965, Ser. No. 473,656
17 Claims. (Cl. 274—1)

ABSTRACT OF THE DISCLOSURE

A turntable carries a record and is spring biased upward toward a tone arm and a speaker cone. A button can be pushed to depress the turntable against the spring bias a small amount to release the tone arm after it has played the record for spring actuated movement to the edge of the turntable. If the turntable is depressed a large amount it registers with a slot in the casing through which the record may be changed. Either the record has a cutout portion at its center or the tone arm has a depression thereon so that the turntable will be released for upward movement when a record has been played, the upward movement of the turntable opening a switch to turn off the phonograph. The turntable also opens the switch in the absence of a record.

This invention relates to toy phonographs, and more particularly to such phonographs intended for use in dolls and other toys. For convenience the phonograph is here referred to as a doll phonograph, but it is used for other purposes as well as in dolls.

The general object of the present invention is to improve doll phonographs. A more particular object is to improve the doll phonograph disclosed in a copending application of Herbert R. Beebe, Ser. No. 307,437, filed Sept. 9, 1963 now Patent No. 3,287,020. That phonograph is electrically-operated, and has the advantage that the speaker is located at the front of a doll body, and a control button for controlling the operation of the phonograph also is located in front. An openable panel may be provided at the back of the doll for changing the battery cell when exhausted, and for adjustment of the mechanism. However, that phonograph has only a single permanently affixed record.

One primary object of the present invention is to provide a doll phonograph having the advantages of the said phonograph, but which may be used with changeable records. Another object is to maintain one-button control of the phonograph, there being a single control element at the front which may be used either to cause playing of a record, or changing of the record.

In the aforesaid phonograph of application Ser. No. 307,437 there is a switch in the motor circuit which is opened by the stylus arm to stop the motor when the stylus reaches the end of the record. The resulting operation has proved satisfatcory but does have some disadvantages, one being that increased stylus pressure may be needed in order to develop sufficient lateral force at the record groove to open the switch, and this in turn tends to increase the wear of the record groove. The operation is sensitive, so that bumping or jarring of the phonograph may cause an unintended operation of the phonograph.

A further object of the present invention is to improve the switch construction and operation. The phonograph has a spring beneath the turntable shaft which urges the turntable toward the stylus arm and diaphragm, and in accordance with the present improvement an added or excess axial movement of the turntable opens the switch, so that the switch operation is effected by the turntable spring, rather than by the lateral stylus travel. An ancillary object of the invention is to provide varied ways to produce the desired extra movement of the turntable at the end of the record.

When dealing with a record-changing phonograph provision should be made to prevent operation of the motor and turntable in the absence of a record on the turntable. In my improved arrangement the absence of a record permits extra travel of the turntable, which in turn opens the aforesaid switch, thereby preventing operation of the motor. A single switch then may be made to serve for both purposes, i.e., it serves both as an "end-of-record" switch and as a "no-record" switch.

To accomplish the foregoing objects, and other more specific objects which will hereinafter appear, my invention resides in the toy phonograph elements and their relation one to another as are hereinafter more particularly described in the following specification. The specification is accompanied by drawings in which.

Figure 1:
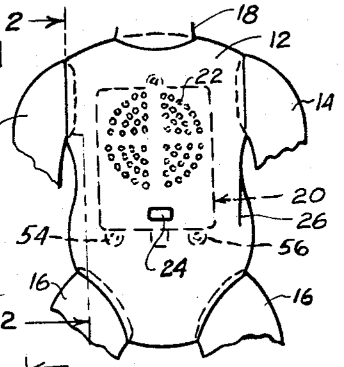
FIG. 1 is a fragmentary view drawn to small scale to show the approximate location of the doll phonograph in a doll.

Referring to the drawing, and more particularly to FIG. 1, the doll body 12 receives the usual pivoted arms 14, legs 16, and neck 18. The body 12 houses a doll phonograph, schematically suggested by the broken line 20. This phonograph has its speaker diaphragm at the front, and the front wall of the body 12 has an array of sound-egress apertures 22. The phonograph also has a depressible button 24 which passes through a mating hole in the front wall of the doll body. The record is changed through a slot at the side of the body, this slot being indicated at 26.

Figure 2:
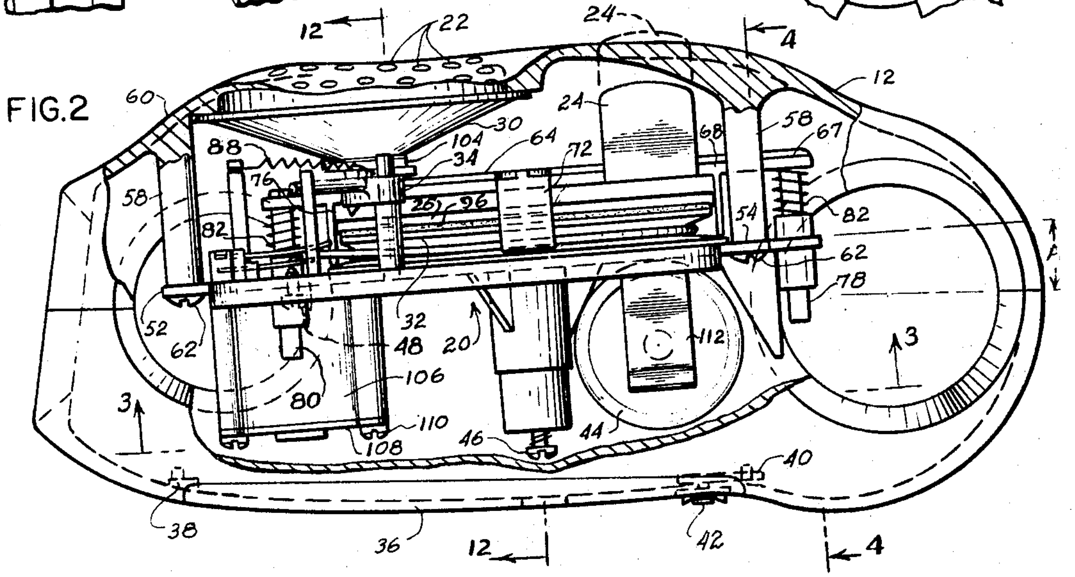
FIG. 2 is a vertical section taken approximately on the line 2—2 of FIG. 1, with the control button fully depressed.

Referring now to FIG. 2, the doll body is shown resting on its back, and the phonograph is described as though in this position, that is, with the speaker diaphragm 30 at the top, the turntable 32 therebeneath, and the stylus arm 34 between the diaphragm 30 and the turntable 32. The control button 24 is referred to as depressible, and causes downward movement of the turntable, but it will be understood that these terms are used merely for convenience, and that in practice the phonograph will play with the doll upright or lying on either side. It is intentionally turned to bring the record slot 26 downward as shown in FIG. 4 when discharging a record, and is turned on its opposite side to bring the record slot upward when loading a new record into the phonograph, so that the record-changing operation is aided gravitationally.

The back of the doll body has a relatively large removable panel 36 (FIG. 2) which is anchored by lugs 38, and a rotatable latch 40 which is turned by a slotted head 42. When the panel 36 is removed there is access to the back of the phonograph for replacement of the flashlight-type cell 44, and for adjustment of two adjusting screws indicated at 46 and 48. In fact the phonograph may be removed for servicing, and referring to FIG. 3 the base 50 of the phonograph has three ears 52, 54, and 56, for mounting the same in the doll. Reverting to FIG. 2, these ears rest against three mating posts 58, which are molded integrally with the front wall 60 of the doll body, and which receive screws 62.

Figure 12:
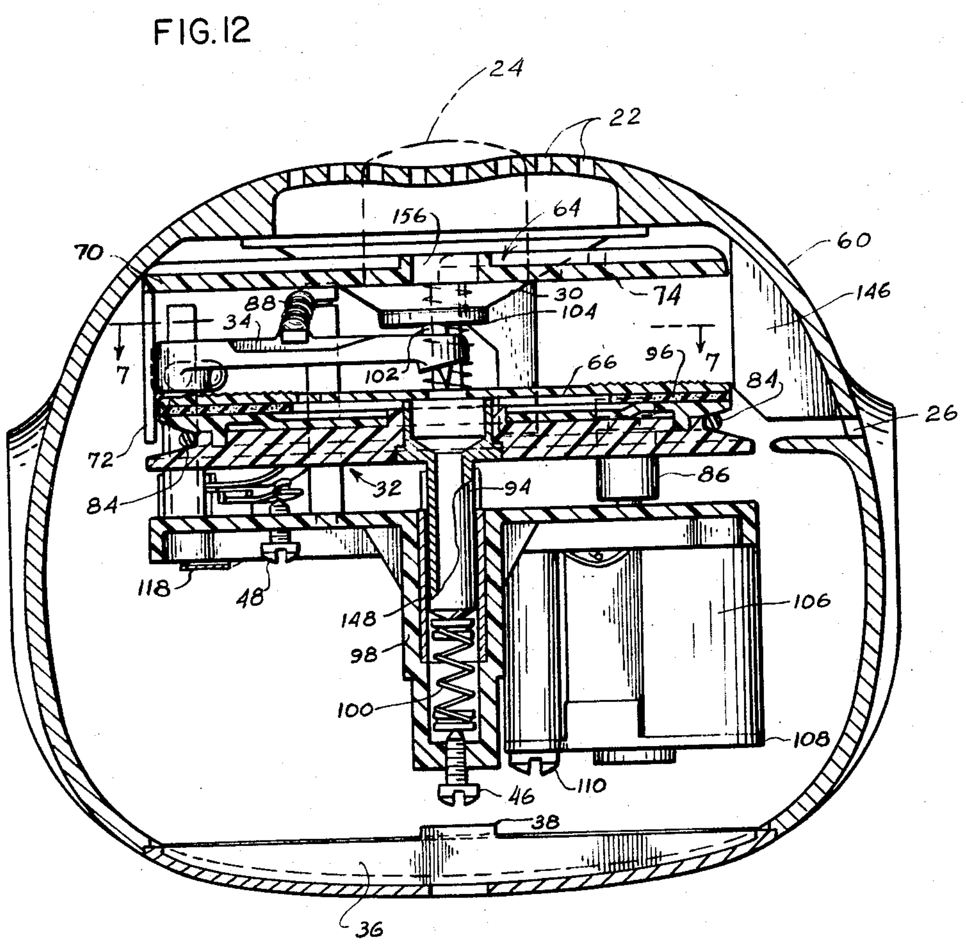
FIG. 12 is a section through the doll phonograph taken approximately on the line 12—12 of FIG. 2.

Referring now to FIGS. 2 and 12 of the drawing, the depressible button 24 carries what may be termed a yoke 64 having a plurality of fingers which straddle the record 66 (FIG. 12) on the turntable, and which bear against the periphery of the turntable outside the record. In the present case there are three such fingers which straddle the record except on one side, that being the side adjacent the record-changing slot 26.

Figures 4, 5, 6, 7, 8, 9, 10, 11:
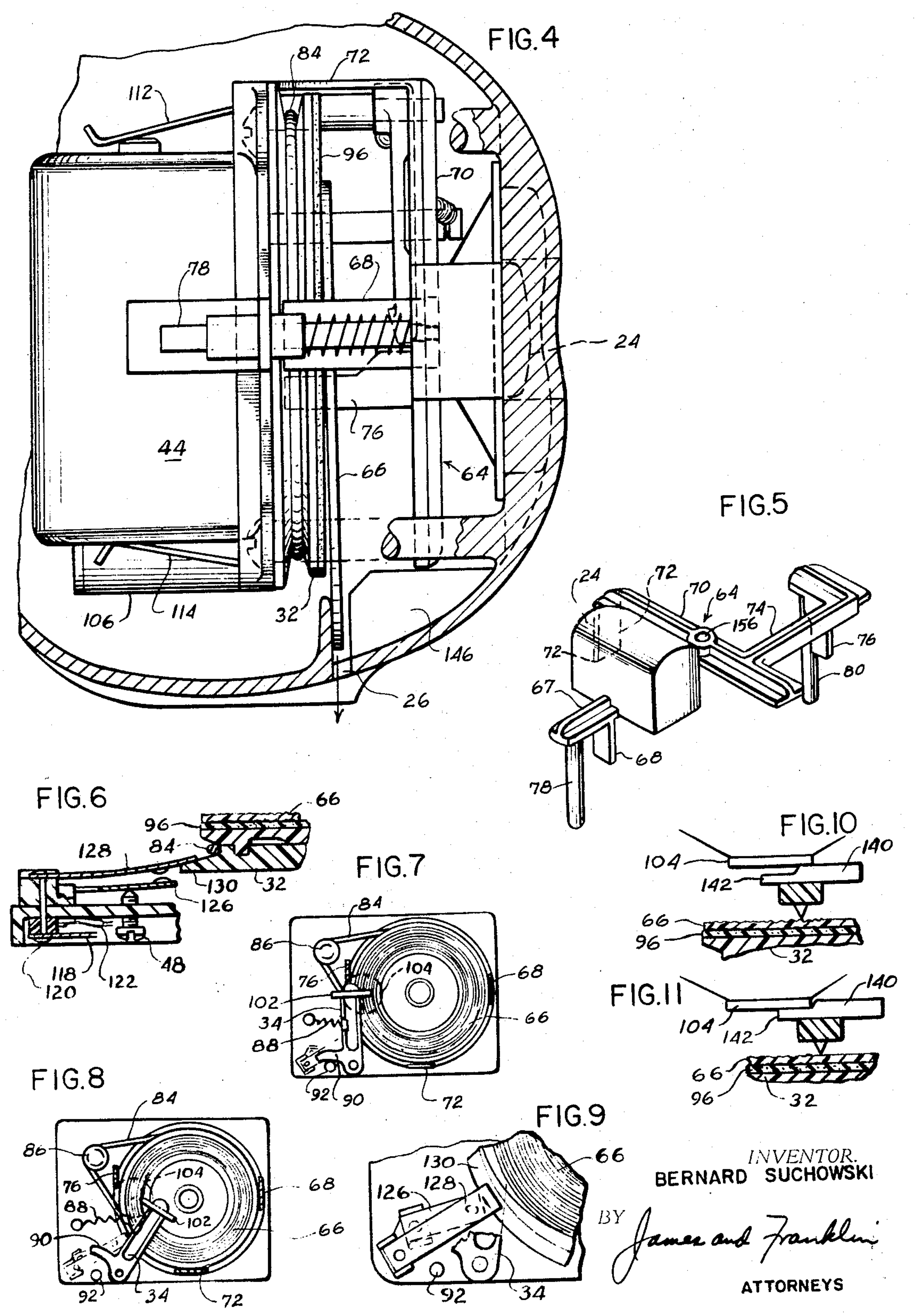
FIG. 4 is a transverse section taken approximately on the line 4—4 of FIG. 2 but with the doll turned on its side for gravitational discharge of a used record.
FIG. 5 is a perspective view showing the control element or button-and-yoke.
FIG. 6 is a fragmentary section drawn to enlarged scale and explanatory of the switch.
FIG. 7 is a schematic plan view drawn to small scale and taken beneath the speaker diaphragm (approximately on the line 7—7 of FIG. 12) with the stylus arm at starting position.
FIG. 8 is a schematic plan view like FIG. 7 but showing the stylus arm at the inner end of the record.
FIG. 9 is a fragmentary plan view of the switch.
FIGS. 10 and 11 are fragmentary sections explanatory of one way to secure operation of the switch at the end of the record.

The particular yoke here employed is shown in FIG. 5, the arm 67 having a finger 68, the arm 70 having a finger 72 and the arm 74 having a finger 76. The complete yoke further includes two guide pins 78 and 80 which are slidably received in the base of the phonograph. FIG. 2 shows the guide pins 78 and 80 with compression springs 82 therearound, the said springs serving to restore the yoke and push button to their normal upward position. FIGS. 7 and 8 show how the fingers 68, 72 and 76 straddle the phonograph record 66, preferably so closely as to center the record without need for the centering pin usually associated with a turntable. The finger 72 is located on the side remote from the record-changing slot. The finger 76 is offset somewhat from a position diametrically opposite the finger 68 in order to avoid interference with the stylus arm 34 and also with the motor-driven belt 84, the motor pulley being shown at 86. In this phonograph the periphery of the turntable is grooved to act as a driven pulley.

FIGS. 7 and 8 also show how the stylus arm 34 is biased or moved outward to starting position by a light pull spring 88. The outward movement is limited by a stop arm 90 which reaches and bears against a pin or stop 92 at which time the stylus is over the starting groove of the record.

Referring now to FIG. 12, the slot 26 is offset downward from the normal playing position of the record 66. The control arrangement is such that a small depression of button 24 releases the stylus arm 34 for outward movement to replay the same record, but a large movement of the button 24 moves the turntable far enough for the record 66 to be in alignment with the slot 26 for discharge of one record and reception of another. FIGS. 2 and 4 show the button depressed, and in FIG. 4 the record 66 is shown moving downward gravitationally through the slot 26. To receive a new record the button is similarly depressed fully, and the doll preferably is turned with the slot 26 at the top so that the new record may be slid into place gravitationally. At this time it is guided and confined by the three fingers of the yoke, which then serve also as centering means to center the record.

Referring to FIG. 12, the turntable 32 is here made of upper and lower discs which interfit as shown, and which are together received by the flanged upper end of a preferably hollow metal spindle 94. The upper end of spindle 94 may be expanded or riveted outward to secure the same to the lower disc of the turntable. The two parts of the turntable may be molded out of a suitable plastics material, and cemented together, thereby forming a pulley groove therebetween to receive the belt 84.

The lower disc of the turntable is made substantially larger in diameter than the upper disc and the phonograph record. One reason is to receive the lower ends of the yoke fingers which straddle the phonograph record as previously described. Another reason is to operate the phonograph switch, as described later. The upper disc of the turntable is no larger in diameter than the phonograph record. It could be somewhat smaller in diameter but preferably has the same diameter, as here shown. The top of the turntable has a frictional surface added thereto, for example, a disc of sponge plastic or sponge rubber, here indicated at 96. A good frictional surface is desired because the record is held against the turntable solely by the stylus pressure, which should not be excessive.

FIG. 12 also shows how turntable shaft 94 is axially slidable as well as rotatable in main bearing 98, and is urged upward by a compression spring 100 housed in bearing 98, and adjusted by means of adjusting screw 46. This urges the turntable and record upward against the stylus, and the back of the stylus arm carries a slide bar 102 which rests slidably against a smooth disc 104 secured to the bottom or inner end of the speaker diaphragm 30. The slide bar 102 of the stylus arm is also shown in FIGS. 7 and 8.

The driving motor is preferably a miniature motor of the permanent-field-magnet type, now commonly used in toys, It is inserted upward in a housing 106 (FIGS. 2 and 12) and is held in position by a bottom plate 108 secured by screws 110. The upper end of the motor and its pulley pass through the base 50 to a position in alignment with the turntable (when the turntable is in normal playing position).

Figure 3:
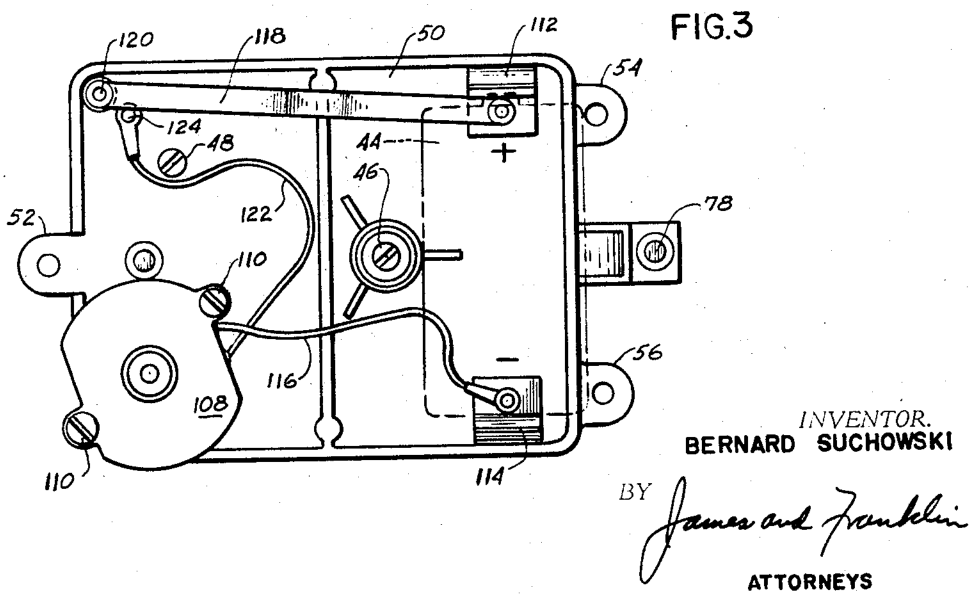
FIG. 3 is a bottom view of the phonograph looking in the direction of the arrows 3—3 of FIG. 2.

Referring to FIG. 3 the cell 44 is received between resilient support brackets 112 and 114. These are mounted on base 50, the latter being molded out of a plastics material which incidentally provides the necessary insulation. A conductor 116 extends from the motor to bracket 114. A conductor, or in this case a thin strip of copper 118, extends from the bracket 112 to a terminal 120, of the switch. A conductor 122 extends from the motor to the other terminal 124 of the switch, so that the switch is connected in series in the motor circuit.

Referring now to FIG. 6, the switch comprises a lower stationary leaf 126 the position of which is adjusted by screw 48, and an upper movable leaf 128, the tip of which overlies the enlarged flange 130 of the turntable 32. The screw 48 is so adjusted that the switch is normally closed, but if the turntable rises to a position higher than the normal record playing position, the switch is opened as shown in FIG. 6. The switch is also shown in FIG. 9, which shows how the contact end of the upper leaf 128 overlies the contact end of the lower leaf 126, but their fixed ends are offset as shown, for convenience in making electrical connection thereto by means of their mounting pins or rivets.

It will be readily apparent how the switch acts as a no-record switch, because in the absence of a record the spring 100 (FIG. 12) raises the turntable 32 (FIG. 6) higher than normal, thereby opening the switch as shown in the drawing.

Figure 14:
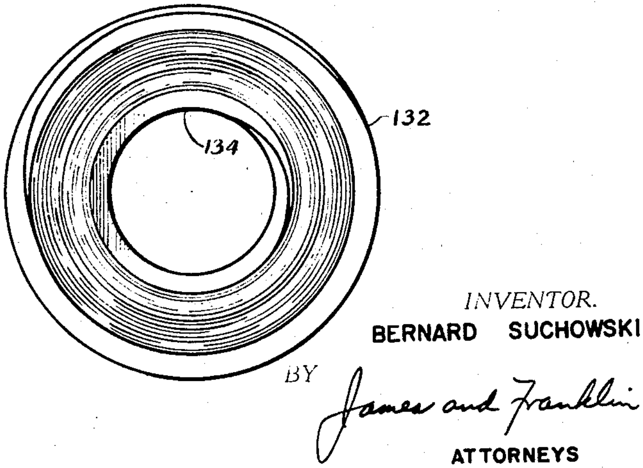
FIG. 14 shows a record which is cut away inside the record grooves.

Additional means is provided to permit a similar excess upward movement at the end of a record, so that the same switch will stop the phonograph when the record has been played. One way to do this is illustrated in FIG. 14, in which the record 132 has its entire center portion cut away as indicated by the circle 134, that is, the record is cut away just inside the record grooves. When the stylus reaches the end of the record the record can rise, and with it the turntable, thus opening the switch. Inasmuch as the present phonograph will operate without a center pin, no harm is done by cutting away the middle area of the record.

Figure 13:
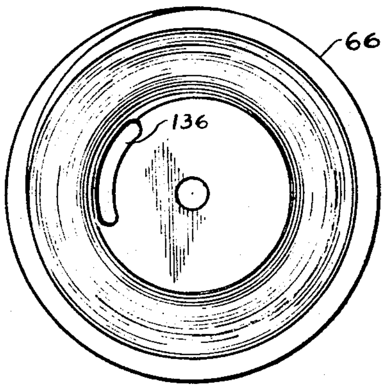
FIG. 13 shows a record having a slot at the end of the record grooves.

However, it is not necessary to cut away the entire center of the record, and it is sufficient to cut out an arcuate slot as shown at 136 in FIG. 13. The record plays until the stylus reaches the slot 136 whereupon the stylus falls into the slot, or more accurately the turntable rises, thereby opening the switch.

It is not necessary to modify the record in order to obtain the desired extra motion of the turntable to open the switch. A different way to accomplish the desired result may be described with reference to FIGS. 7, 8, 10 and 11 of the drawing. It will be recalled that the stylus arm 34 has a slide bar 102. As so far described the slide bar is assumed to be uniform in height. However, in FIGS. 10 and 11 I show a modified slide bar 140 which is cut away or stepped downward at its trailing end 142. The location of the step is so related to the button or disc 104 of the diaphragm, and to the record grooves, that at the end of the record the step reaches the edge of the disc 104, permitting the stylus arm to rise, and the record and turntable rise with it, thus opening the switch. The pivot of the stylus arm has enough freedom to permit this small upward movement.

In FIGS. 7 and 8 the position of the diaphragm disc is indicated in broken lines at 104 (the disc is above the stylus arm), and it will be seen how the movement of the stylus arm from the position shown in FIG. 7 to the position shown in FIG. 8 brings much of the slide bar beyond the disc 104, leaving only the trailing end of the slide bar 102 beneath the disc 104, which is the situation illustrated by the change from FIG. 10 to FIG. 11 of the drawing.

Reverting to FIG. 12, the front wall 60 of the doll body preferably has an internal abutment 146 molded integrally therewith, the said abutment coming just outside the periphery of record 66 when the record is in its raised or playing position. This acts as a fourth centering means to center the record. It is opposite the yoke finger 72. The abutment 146 slopes toward and terminates at the slot 26, and therefore does not interfere with discharge of a used record.

The molded plastic bearing housing 98 (FIG. 12) preferably is lined with a lubricated bearing sleeve 148. To minimize friction the bearing sleeve may be of the powdered metal type impregnated with a lubricant.

The screw 46 which adjusts the force of spring 100 may be used as a speed regulating means. This is so because the turntable speed is slowed when the stylus pressure is increased, and vice-versa. The parts are so designed that at correct speed there is adequate force to operate the switch and to transfer the hill-and-dale vibrations of the record grooves to the diaphragm.

It will be noted in FIG. 2 that the entire phonograph is set at an angle relative to the axis of the body, this angle being indicated by the arrow A. In FIG. 2 the neck or upper end of the body is at the left. When the body is upright the said angle avoids an increase in stylus pressure which otherwise might be caused by the weight of the turntable. There is considerable tolerance in stylus pressure, and I find that the phonograph will play with the doll supine, or lying on one side or the other, or with the doll upright. It will not play with the doll prone, but of course, at that time the speaker would be blocked and muffled anyway, and the button would be out of reach, and therefore the phonograph would not be played with the doll in that position.

The button 24 is preferably made large in area as shown, so that it can be depressed below the surface of the body. In preferred form the button projects from the body only slightly, and is depressed to a flush position to release the stylus to replay the same record. However, to change a record, a finger tip is used to depress the button more deeply. In practice, the doll has a loose dress, and a flat squeeze may be applied outside the dress to replay the same record, but the dress is turned up when changing the record, this anyway being necessary for access to the record slot at the side of the body.

The record preferably has recording groove on both faces, so that a child using the record will not have to remember which side should face the stylus when inserting a record. The record may be a multiple groove record, or it may have a single continuous recording.

In the illustrated case the record is 2¾ inches in diameter, and the slot 136 in FIG. 13 is located at a radius of say ⅝ inch. The record has a thickness of say 1/16 inch and the slot 26 in the side of the doll body has a width of say ⅛ inch. The surface of the turntable is covered with a frictional sheet material having an adhesive backing, and foamed urethane or sponge rubber have proved suitable. The fingers of the yoke fit around the rim of the record with a clearance of say 1/32 inch, this clearance being limited in order to center the record.

Figure 15:
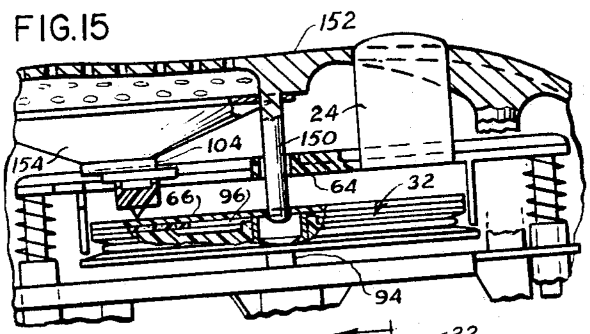
FIG. 15 is a fragmentary vertical section through a modification.

However, if desired a centering pin may be provided, but not on the turntable. Instead, the centering pin is a fixed centering pin located as shown in FIG. 15 of the drawing, referring to which a pin 150 is molded integrally with the front wall 152 of the doll body. It passes through an aperture near the rim of the diaphram 154. It also passes through a hole in the yoke 64, this hole being shown at 156 in FIG. 5. The pin 150 is long enough to reach and center the record when the turntable is raised, but the record is free when the turntable is depressed for the record changing operation.

The phonograph may be provided with an end-of-record switch like that shown in the aforesaid Beebe application Ser. No. 307,437, which switch is operated by the stylus arm. In such case it would still be desirable to add a switch like that here shown to provide the safety of a no-record switch. The two switches then would be connected electrically in series with each other and with the motor. Obviously it is a simplification to accomplish both functions with a single switch as here shown.

The phonograph is compact, and will fit in a doll of ordinary size. No special housing is needed when the phonograph is used in a doll, but if used for other purposes a suitable housing may be provided, and on the outside this may be a simple rectangular housing. The phonograph mechanism (excepting the diaphragm) is carried on a single mounting plate, with lugs or ears for mounting screws. The phonograph structure is relatively simple to assemble, and inexpensive to manufacture. The location of the operating button at the front is of advantage when using the phonograph, whether used in a doll or in some other housing for some other purpose. It goes without saying that when the phonograph is mounted in a rectangular housing, the appropriate side wall of the housing is provided with a slot equivalent to the slot 26 here shown, and also is provided with a guide abutment equivalent to the abutment 146. If a centering pin is wanted, it is formed on the front wall of the housing, which wall also carries the diaphragm.

It is believed that the construction and method of use of my improved doll phonograph, as well as the advantages thereof, will be apparent from the foregoing detailed description. It will also be apparent that while I have shown and described the mechanism in several preferred forms, changes may be made.

In the claims the reference to the stylus arm moving outward to starting position is not intended to exclude a form in which the stylus travel is from the inside outward, the only difference then being that the stylus arm is biased inward to its starting position, and moves beyond the outer periphery of the record at the end of the record to open the switch. In the claims the reference to the control button being depressible assumes that the phonograph is in the position shown in FIG. 2, but in practice the phonograph is used in other positions, as previously mentioned. The reference in some claims to the upper part of the turntable having the same diameter as the record, means merely that it is no larger in diameter than the record, and is not intended to exclude a construction in which it is somewhat less than the diameter of the record.

I claim:

1. A toy phonograph for use with changeable records, said phonograph comprising a speaker diaphragm, a turntable having a normal playing position, a stylus arm movable laterally therebetween, means biasing the arm outward to starting position, a turntable shaft, a main bearing receiving said shaft slidably and rotatably, resilient means urging the shaft and turntable upward toward the stylus arm and diaphragm, said upward movement being limited by contact of a record on the turntable with the stylus arm, a control element carrying a yoke having fingers which bear against the periphery of the turntable outside the record, a housing around said phonograph having a slot through which a record may be received or discharged, said slot being downwardly offset from the normal playing position of the turntable, the arrangement being such that a small movement of the control element against the force of the resilient means moves the turntable and record away from the stylus and thereby releases the stylus arm from the record for outward movement to replay the same record, and a large movement of the control element moves the turntable downward far enough for the record to be in alignment with the slot for discharge of one record and reception of another.

2. A toy phonograph for use with changeable records, said phonograph comprising a speaker diaphragm, a turntable having a normal playing position, a stylus arm movable laterally therebetween, means biasing the arm outward to starting position, a turntable shaft, a main bearing receiving said shaft slidably and rotatably, resilient means urging the shaft and turntable upward toward the stylus arm and diaphragm, said upward movement being limited by contact of a record on the turntable with the stylus arm, a depressible button at one side of the diaphragm carrying a yoke having fingers which straddle the record and bear against the turntable, there being a plurality of such fingers which straddle the record except on one side, a housing around said phonograph having a slot through which a record may be received or discharged, said slot being downwardly offset from the normal playing position of the turntable, the arrangement being such that a small depression of the button against the force of the resilient means moves the turntable and record away from the stylus and thereby releases the stylus arm from the record for outward movement to replay the same record, and a large movement of the button moves the turntable downward far enough for the record to be in alignment with the slot for discharge of one record and reception of another.

3. A toy phonograph for use with changeable records, said photograph comprising a speaker diaphragm, a turntable having a normal playing position, a stylus arm movable laterally therebetween, a light spring urging the arm outward to starting position, a turntable shaft, a main bearing receiving said shaft slidably and rotatably, resilient means urging the shaft and turntable upward toward the stylus arm and diaphragm, said upward movement being limited by contact of a record on the turntable with the stylus arm, a depressible button at one side of the diaphragm carrying a yoke having fingers which straddle the record and bear against the turntable, the periphery of said turntable being stepped, the upper part of the turntable having the same diameter as the record and the lower part being larger in diameter to receive the lower ends of the fingers of the yoke, there being a plurality of such fingers which straddle and center the record except on one side, a housing around said phonograph having a slot through which a record may be received or discharged, said slot being downwardly offset from the normal playing position of the turntable, the arrangement being such that a small depression of the button against the force of the resilient means moves the turntable and record away from the stylus and thereby releases the stylus arm from the record for outward movement to replay the same record, and a large movement of the button moves the turntable far enough downward for the record to be in alignment with the slot for discharge of one record and reception of another.

4. A toy phonograph comprising a speaker diaphragm, a turntable having a normal playing position, a stylus arm movable laterally therebetween, means biasing the arm outward to starting position, a turntable shaft, a main bearing receiving said shaft slidably and rotatably, resilient means urging the shaft and turntable upward toward the stylus arm and diaphragm, the upward movement of said turntable and shaft being limited by restraining contact of a record on the turntable with the stylus arm, a control element for depressing the turntable and record away from the stylus arm and thereby releasing the stylus arm from the record to move outward to starting position, a switch alongside the turntable and having a part in the path of the turntable to open the switch when the turntable is moved by the resilient means upward beyond the normal playing position, a motor to drive the turntable, said switch being connected in the motor circuit, and means to free said restraining contact when said stylus arm reaches the end of a record so that the resilient means causes an upward movement of the turntable beyond the normal playing position and the switch stops the phonograph when the record has been played.

5. A toy phonograph comprising a speaker diaphragm, a turntable having a normal playing position, a stylus arm movable laterally therebetween, means biasing the arm outward to starting position, a turntable shaft, a main bearing receiving said shaft slidably and rotatably, resilient means urging the shaft and turntable upward toward the stylus arm and diaphragm, the upward movement of said turntable and shaft being limited by restraining contact of a record on the turntable with the stylus arm, a control element for depressing the turntable and record away from the stylus arm and thereby releasing the stylus arm from the record to move outward to starting position, a leaf spring switch alongside the turntable and having a part in the path of the turntable to open the switch when the turntable is moved by the resilient means upward beyond the normal playing position, a small battery operated motor to drive the turntable, said switch being connected in the motor circuit, the arrangement being such that in the absence of a record the resilient means moves the turntable upward beyond the normal playing position and thereby opens the switch.

6. A toy phonograph comprising a speaker diaphragm, a turntable having a normal playing position, a stylus arm movable laterally therebetween, a light spring urging the arm outward to starting position, a turntable shaft, a main bearing receiving said shaft slidably and rotatably, resilient means urging the shaft and turntable upward toward the stylus arm and diaphragm, the upward movement of said turntable and shaft being limited by restraining contact of a record on the turntable with the stylus arm, a depressible button at one side of the diaphragm carrying means for depressing the turntable and record away from the stylus arm and thereby releasing the stylus arm from the record to move outward to starting position, a leaf spring switch alongside the turntable and having a part in the path of the turntable to open the switch when the turntable is moved by the resilient means upward beyond the normal playing position, a small battery operated motor to drive the turntable, said switch being connected in the motor circuit, the arrangement being such that in the absence of a record the resilient means moves the turntable upward beyond the normal playing position and thereby opens the switch, and additional means to free said restraining contact when said stylus arm reaches the end of a record so that the resilient means causes a similar upward movement of the turntable and the switch stops the phonograph when the record has been played.

7. A toy phonograph for use with changeable records, said phonograph comprising a speaker diaphragm, a turntable having a normal playing position, a stylus arm movable laterally therebetween, means biasing the arm outward to starting position, a turntable shaft, a main bearing receiving said shaft slidably and rotatably, resilient means urging the shaft and turntable upward toward the stylus arm and diaphragm, the upward movement of said turntable and shaft being limited when the turntable is in its normal playing position by restraining contact of a record on the turntable with the stylus arm, a control element carrying a yoke having fingers which bear against the periphery of the turntable outside the record, a housing around said phonograph having a slot through which a record may be received or discharged, said slot being downwardly offset from the normal playing position of the turntable, the arrangement being such that a small movement of the control element against the force of the resilient means moves the turntable and record away from the stylus and thereby releases the stylus arm from the record for outward movement to replay the same record, and a large movement of the control element moves the turntable downward far enough for the record to be in alignment with the slot for discharge of one record and reception of another, a switch alongside the turntable and having a part in the path of the turntable to open the switch when in the absence of said restraining contact the turntable is moved by the resilient means upward beyond the normal playing position, and an electric motor to drive the turntable, said switch being connected in the motor circuit.

8. A toy phonograph for use with changeable records, said phonograph comprising a speaker diaphragm, a turntable having a normal playing position, a stylus arm movable laterally therebetween, means biasing the arm outward to starting position, a turntable shaft, a main bearing receiving said shaft slidably and rotatably, resilient means urging the shaft and turntable upward toward the stylus arm and diaphragm, the upward movement of said turntable and shaft being limited by restraining contact of a record on the turntable with the stylus arm, a depressible button at one side of the diaphragm carrying a yoke having fingers which straddle the record and bear against the turntable, there being a plurality of such fingers which straddle the record except on one side, a housing around said phonograph having a slot through which a record may be received or discharged, said slot being downwardly offset from the normal playing position of the turntable, the arrangement being such that a small depression of the button against the force of the resilient means moves the turntable and record away from the stylus and thereby releases the stylus arm from the record for outward movement to replay the same record, and a large movement of the button moves the turntable downward far enough for the record to be in alignment with the slot for discharge of one record and reception of another, a switch alongside the turntable and having a part in the path of the turntable to open the switch when the turntable is moved by the resilient means upward beyond the normal playing position, a motor to drive the turntable, said switch being connected in the motor circuit, the arrangement being such that in the absence of a record the resilient means moves the turntable upward beyond the normal playing position and thereby opens the switch, and additional means to free said restraining contact when said stylus arm reaches the end of a record so that the resilient means causes a similar upward movement of the turntable and the switch stops the phonograph when the record has been played.

9. A toy phonograph for use with changeable records, said phonograph comprising a speaker diaphragm, a turntable having a normal playing position, a stylus arm movable laterally therebetween, a light spring urging the arm outward to starting position, a turntable shaft, a main bearing receiving said shaft slidably and rotatably, resilient means urging the shaft and turntable upward toward the stylus arm and diaphragm, the upward movement of said turntable and shaft being limited by restraining contact of a record on the turntable with the stylus arm, a depressible button at one side of the diaphragm carrying a yoke having fingers which straddle the record and bear against the turntable, the periphery of said turntable being stepped, the upper part of the turntable having the same diameter as the record and the lower part being larger in diameter to receive the lower ends of the fingers of the yoke, there being a plurality of such fingers which straddle and center the record except on one side, a housing around said phonograph having a slot through which a record may be received or discharged, said slot being downwardly offset from the normal playing position of the turntable, the arrangement being such that a small depression of the button against the force of the resilient means moves the turntable and record away from the stylus and thereby releases the stylus arm from the record for outward movement to replay the same record, and a large movement of the button moves the turntable downward far enough for the record to be in alignment with the slot for discharge of one record and reception of another, a leaf spring switch alongside the turntable and having a part in the path of the turntable to open the switch when the turntable is moved by the resilient means upward beyond normal playing position, a motor to drive the turntable, said switch being connected in the motor circuit, the arrangement being such that in the absence of a record the resilient means moves the turntable upward beyond the normal playing position and thereby opens the switch, and additional means to free said restraining contact when the stylus arm reaches the end of a record so that the resilient means causes a similar upward movement of the turntable and the switch stops the phonograph when the record has been played.

10. A toy phonograph as defined in claim 4, in which the center portion of the record inside the sound grooves is cut away to afford axial movement of the turntable and opening of the switch.

11. A toy phonograph as defined in claim 8, in which the center portion of the record inside the sound grooves is cut away to afford axial movement of the turntable and opening of the switch.

12. A toy phonograph as defined in claim 4, in which the phonograph record has a slot just inside the sound grooves to afford axial movement of the turntable and opening of the switch.

13. A toy phonograph as defined in claim 8, in which the phonograph record has a slot just inside the sound grooves to afford axial movement of the turntable and opening of the switch.

14. A toy phonograph as defined in claim 4, in which the speaker diaphragm has a smooth button at its lower end, and in which the stylus arm has a slide bar which moves slidably against the button to transfer hill-and-dale vibrations from the record to the diaphragm, and in which the trailing portion of the slide bar is depressed in such location that the stylus arm and turntable move upward at the end of the playing of a record, to open the switch.

15. A toy phonograph as defined in claim 8, in which the speaker diaphragm has a smooth button at its lower end, and in which the stylus arm has a slide bar which moves slidably against the button to transfer hill-and-dale vibrations from the record to the diaphragm, and in which the trailing portion of the slide bar is depressed in such location that the stylus arm and turntable move upward at the end of the playing of a record, to open the switch.

16. A toy phonograph as defined in claim 1, in which the front of the housing has a fixed centering pin the lower end of which enters the center hole of the record when the record is in raised or playing position, but not when the turntable is lowered for record changing.

17. A toy phonograph as defined in claim 7, in which the front of the housing has a fixed centering pin the lower end of which enters the center hole of the record when the record is in raised or playing position, but not when the turntable is lowered for record changing.

References Cited

UNITED STATES PATENTS 3,287,020 11/1966 Beebe ---------------- 274—9

LEONARD FORMAN, *Primary Examiner.*

L. ANDERSON, *Assistant Examiner.*